United States Patent [19]

Mizuhara

[11] Patent Number: 4,835,793
[45] Date of Patent: May 30, 1989

[54] CERAMIC LASER TUBE

[75] Inventor: Howard Mizuhara, Hillsborough, Calif.

[73] Assignee: GTE Products Corporation, Stamford, Conn.

[21] Appl. No.: 191,678

[22] Filed: May 9, 1988

[51] Int. Cl.[4] .............................................. H01S 3/03
[52] U.S. Cl. ........................................ 372/61; 372/56
[58] Field of Search ................. 372/61, 38; 219/28 A

[56] References Cited

U.S. PATENT DOCUMENTS 3,881,088  4/1975  Karras ................................. 219/284
3,891,941  7/1975  Roberts et al. ........................ 372/38
4,761,792  8/1988  Mautland ............................... 372/61

Primary Examiner—Léon Scott, Jr.
Attorney, Agent, or Firm—James Theodosopoulos

[57] ABSTRACT

A laser tube made of alumina and utilizing copper as the lasing medium and having coated on the inner surface of the laser tube a plurality of dots of a copper wettable metal of the type on which copper will condense as the copper cools from the vapor state.

8 Claims, 1 Drawing Sheet

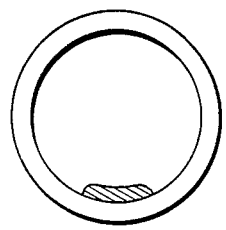
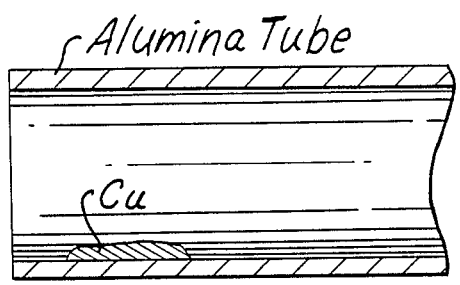
FIG. 1A  FIG. 1B
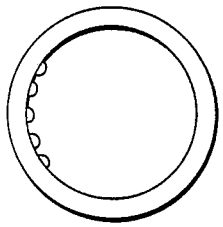
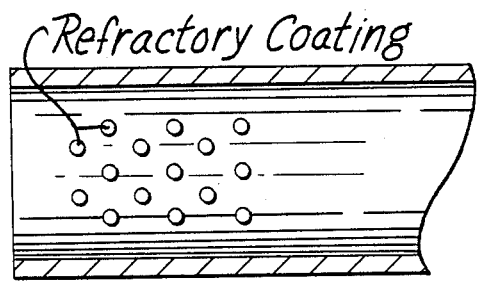
FIG. 2A  FIG. 2B
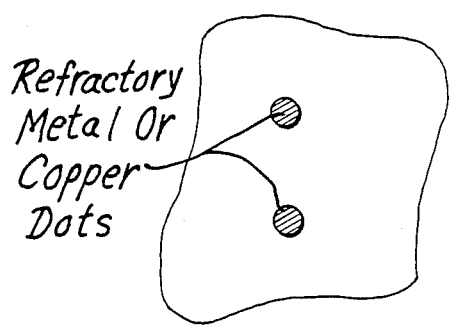
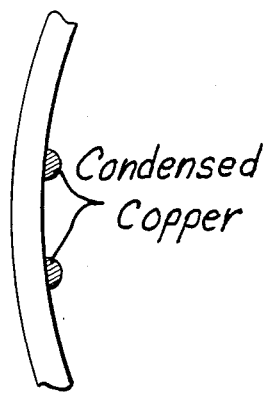
FIG. 3A  FIG. 3B

CERAMIC LASER TUBE

This invention concerns ceramic laser tubes utilizing copper as the lasing medium. An example of such a tube is disclosed in U.S. Pat. No. 4,696,011.

The tube operates above 1083° C., the melting point of copper. When operation is shut down, molten copper collects at each end of the tube where the temperature is the lowest. The quantity of such copper can be quite large. For example, in one 3½" inside diameter alumina tube, the pool of copper was about 1" wide by about 2" long by about ⅛" to 3/16" thick. Upon cooling, the copper adheres strongly to the alumina surface. Because of the thermal expansion difference between copper ($16.5 \times 10^{-6}$/°C.) and alumina ($8 \times 10^{-6}$/°C.), the tube can fracture after the sizable copper pool cools to a temperature where yielding of the copper does not occur. This invention discloses a solution to the problem.

In accordance with this invention there is disclosed an alumina tube for use as a laser tube utilizing copper as the lasing medium. Disposed on the inner surface of the alumina tube are a plurality of small metallic dots on which the copper vapor can condense as it cools. The droplet of copper on each dot is too small to exert sufficient stress on the alumina to cause fracture.

BRIEF DESCRIPTION OF THE DRAWINGS

Further details of the invention reside in the exemplary embodiments described below with reference to the drawings in which:

FIGS. 1A and 1B represent end and side views, respectively of a typical solidified copper on an alumina tube.

FIGS. 2A and 2B represent end and side views, respectively of a refractory metal coated alumina tube.

FIGS. 3A and 3B represent magnified views of copper condensed on refractory or copper dots.

EXAMPLE 1

Copper oxide ($Cu_2O$) is ground fine and mixed with very little glycerol to form a thick paste. The paste is applied on a surface of an Al-995 alumina substrate 1¼"×¼"×0.100". The copper oxide is applied as a ⅛" diameter dot using a wooden applicator stick.

Multiple copper oxide dots ¼" center to center were applied on AL-995 substrate surfaces. The coated alumina substrates were air fired for 1 hour at 175° to 200° C. followed by rapid heating rate to 1000° C. and held for 12 hours and cooled. The resulting system is reduced in hydrogen atmosphere furnace at 950° C.

The prepared metallic copper dotted surface on exposure to copper vapor showed copper condensation. The evaporation loss of the applied copper dots in the laser tube during high temperature operation is nil because of the saturated copper vapor pressure atmosphere present.

EXAMPLE 2

A refractory metallizing paint pigment consisting of 80% −325 mesh tungsten powder, 10% manganese and 10% alumina is mixed in a ceramic mill using 99.5% alumina grinding media, and milled for 48 hours. The pigment mix is mixed with organic vehicle to permit application via dot applicator on to an AL-995 substrate. The dried paint is wet hydrogen fired at 1500° C. for 30 minutes and cooled under wet hydrogen. The refractory metal coated substrates were subjected to copper vapor under argon atmosphere, and on cooling resulted in copper condensing onto the refractory metal surface.

EXAMPLE 3

A thick paste is prepared from finely ground lithium molybdate and water-glycerol mix. The paste is applied ¼" center to center, and ⅛" in diameter dot size on to an AL-995 substrate. The substrate is fired under 1100° C. wet hydrogen atmosphere for 30 minutes and on cooling showed light grey metallic dot. The test coupons were subjected to argon gas at elevated temperature of 1400° C. under copper vapor and on cooling showed copper coated dots. The lithium aids in bonding the molybdenum to the alumina.

EXAMPLE 4

A paste consisting of #235 screening oil, which is made by Ceramic Color Co. and an alloy of copper ABA (L) in the form of a powder is prepared and applied on alumina substrate. The applied dots measuring ⅛" diameter and spaced ¼" apart are heated to 1040° C. for 10 minutes under $10^{-5}$ torr vacuum. The alloy melts and adheres to the alumina to act as a condensation site. Copper ABA (L) is an alloy of 3.5 wt. % Si, 2.5 wt. % Si, balance Cu, made by the Wesgo Division of GTE Products Corporation.

EXAMPLE 5

Same as Example 4 using an alloy of copper ABA (H). The braze is carried out at 1125° C. by 10 minutes under $10^{-5}$ torr vacuum. The result is copper alloy bonded to alumina substrate. Copper ABA (H), also made by Wesgo, is an alloy of 8 wt. % Ni, 1.5 wt. % Si, 1 wt. % Ti, balance Cu.

I claim:

1. The method of preventing fracture of an alumina laser tube utilizing copper as a lasing medium by coating on the inner surface of the laser tube a plurality of copper wettable metallic dots of the type on which copper will condense as the copper cools from the vapor state.

2. The method of claim 1 wherein the metallic dots are formed by making a thick paste one ingredient of which is a copper wettable metal powder in elemental or compound form, applying the paste to the inner surface of the laser tube to form dots thereon, and firing the paste in a reducing atmosphere to bond the dots to the laser tube and to place the copper wettable metal in its elemental state.

3. A laser tube made of alumina and utilizing copper as the lasing medium and having coated on the inner surface of the laser tube a plurality of dots of a copper wettable metal of the type on which copper will condense as the copper cools from the vapor state.

4. The laser tube of claim 3 wherein the copper wettable metal is copper.

5. The laser tube of claim 3 wherein the copper wettable metal is tungsten.

6. The laser tube of claim 3 wherein the copper wettable metal is molybdenum.

7. The laser tube of claim 3 wherein the copper wettable metal is copper ABA (L).

8. The laser tube of claim 3 wherein the copper wettable metal is copper ABA (H).

* * * * *